United States Patent [19]

Hayashi et al.

[11] 4,009,312

[45] Feb. 22, 1977

[54] HEAT-ADHESIVE FILM LAMINATE

[75] Inventors: Ikuya Hayashi; Keiichi Uno; Mikio Matsuoka, all of Otsu, Japan

[73] Assignee: Toyo Boseki Kabushiki Kaisha, Osaka, Japan

[22] Filed: Jan. 23, 1974

[21] Appl. No.: 435,925

[30] Foreign Application Priority Data

Feb. 2, 1973  Japan .................. 48-13957

[52] U.S. Cl. .................. 428/213; 428/214; 428/215; 428/216; 428/349; 428/354; 428/412; 428/458; 428/474; 428/480; 426/126; 426/412; 260/860

[51] Int. Cl.² .............. B32B 15/08; B32B 27/36; B32B 27/28

[58] Field of Search .......... 161/214, 165; 428/458, 428/480, 474, 349, 212, 412, 354, 213, 214, 215, 216; 260/860

[56] References Cited

UNITED STATES PATENTS

| | | | |
|---|---|---|---|
| 3,013,914 | 12/1961 | Willard ................ | 260/860 |
| 3,136,655 | 6/1964 | Wolinski ................ | 428/480 |
| 3,372,148 | 3/1968 | Wiener ................ | 161/214 |
| 3,502,623 | 3/1970 | Hurworth ................ | 161/214 |
| 3,556,816 | 1/1971 | Nughes ................ | 161/214 |
| 3,784,520 | 1/1974 | Hoeschele ................ | 260/860 |
| 3,849,515 | 11/1974 | Muller ................ | 260/860 |
| 3,892,058 | 7/1975 | Komatsu ................ | 426/412 |
| 3,914,502 | 10/1975 | Hayashi ................ | 428/412 |

*Primary Examiner*—George F. Lesmes
*Assistant Examiner*—Ellis P. Robinson
*Attorney, Agent, or Firm*—Barry Kramer

[57] ABSTRACT

A heat-adhesive film laminate comprising a film of a plastic material having excellent heat resistance such as polyesters, polyamides or polycarbonates laminated on one side of a metal foil such as aluminum foil, copper foil, iron foil or the like and a film of a resin comprising predominantly block copolyester having a melting point of higher than 140° C but lower than the temperature at which the characteristics of the plastic film is deteriorated and a Young's modulus $\epsilon$ (dyne/cm²) and a breaking elongation $(\Delta l/l_o) \times 100$ (%) when measured at 20° C and 100° C being as follows, respectively:

$10^7$ (dyne/cm²) $< \epsilon < 10^{10}$ (dyne/cm²) and $(\Delta l/l_o) \times 100 > 40$ (%)

laminated on other side of the metal foil.

12 Claims, No Drawings

HEAT-ADHESIVE FILM LAMINATE

The present invention relates to a heat-adhesive film laminate having excellent heat resistance. More particularly, it relates to a heat-sealable plastic film laminate having excellent heat resistance and being useful for foods packaging and tolerable to retort sterilization, which is produced by laminating a film of plastic material having excellent heat resistance such as polyesters, polyamides or polycarbonates on one side of a metal foil and further laminating a film of a resin comprising predominantly block copolyester on other side of the metal foil.

There have, hitherto, been used various plastic films for various food packagings. Generally, the foods must be sterilized for preventing putrescence of foods and for preserving them for a long time. An acidic food or alcoholic food can be sterilized merely by heating it at about 60° to 70° C. A food containing comparatively large amount of sugar or salt can be preserved for a while even if it is not subjected to any specific sterilization step. Furthermore, some foods such as sausage, boiled fish paste, and boiled beans can be sterilized by boiling them at about 100° C. However, when the foods must be sterilized completely and preserved for a long time, such sterilization methods as mentioned above are not suitable, but they must be sterilized at higher temperatures as more than 100° C, usually at 110° to 120° C. The sterilization at more than 100° C is usually carried out by using a retort pouch (pressure vessel for sterilization). For complete sterilization it is necessary to heat at about 120° C for 15 minutes in a retort pouch. Accordingly, if a packaged food must be sterilized under such severe conditions, the plastic film used as the packaging material must be tolerant to such high temperature as at least 120° C and to a pressure.

The plastic film used for retort must have not only heat resistance but also various other characteristics, such as sufficient barrier properties from oxygen or steam, heat-sealing characteristics in a wide range of temperature, excellent heat-seal strength, coldproofing, resistance to boiling water, oil resistance, impact strength, and further be non-toxic, odorless and not expensive. As the film having such characteristics and being useful for retort sterilization, there have, hitherto, used various combination of films, for example, a laminated (two layers) film comprising a polyethylene or polypropylene film and a polyester film, polyamide film or polycarbonate film, and a three layers film having an aluminum foil between the two layers of the above laminated film. Among them, a three layers film comprising polyester film, aluminum foil and polyethylene film has been widely used for retort sterilization at 120° C, by which sterilization the food can be preserved for about 6 months to one year.

Usually, the retort sterilization is carried out at about 120° C for 15 minutes. In the retort sterilization procedure, a further treatment in the retort pouch is required for about same time before and after the sterilization, since the temperature must be raised from room temperature to the sterilization temperature or lowered from the sterilization temperature to room temperature while controlling the pressure in the retort pouch. Accordingly, it has been desired to shorten the sterilization time for rationalization of the retort treatment and for reducing the cost. The heat sterilization procedure should be carried out at sufficiently high temperature and for enough time for killing the spore of bacteria which has high heat resistance, and the relation between the temperature and the time enough for killing the spore may be shown by "logarithmic rule". That is, the number of killed spore varies logarithmically in accordance with the change of the temperature and the time. Accordingly, when the sterilization temperature is raised, the sterilization time can be largely reduced. The conventional retort pouch made from polyester/polyethylene or polyester/aluminum foil/polyethylene may barely tolerate just to 120° C in viewpoint of the heat resistance (not so high) of polyethylene which composes the inner layer of the retort pouch.

According to the present inventors' study, it has been found that for giving an excellent heat adhesion property to a film, generally the heat adhesive resin layer of the film must 1. be liquefy by heating and thereby flowed every nook and corner of the surface of the subject to be adhered,
2. have a good affinity with the subject to be adhered, have a good thermodynamic wetting, and make appear the intermolecular forces between the resin and the subject to be adhered,
3. be solidified rapidly,
4. have a small residual stress, and
5. have so good flexibility that any stress concentration does not occur when it is destroyed, and simultaneously have a good cohesive force enough to resist destruction. The property to resist destruction means the one required after the laminated film is adhered or heat-sealed, and the film must satisfy the condition mentioned in the above item (5) at high temperature when it is treated at high temperature. Moreover, the laminated film is generally used at a wide range of temperature from high temperature through room temperature, and therefore the resin must have such good dynamic property as satisfy the condition mentioned in the above item (5) at a wide range of temperature from high temperature such as 100° C or more through low temperature such as room or lower temperature.

Thus, among the above-mentioned conditions (1) to (5), the condition (5) i.e. the dynamic property plays a most important role in giving such excellent adhesion strength or heat-seal strength in a wide range of temperature to the film, and the dynamic property is effected largely by the thermic property of the adhesive resin. That is, the adhesive resin layer is preferable to have a glass transition point of less than room temperature and also a melting point of more than 100° C as the thermic property, for giving the laminated film such excellent adhesion strength or heat-seal strength in a wide range of temperature from less than room temperature through high temperature of 100° C or more.

Under the circumstances, the present inventors have studied the condition (5) and then it has been found that for obtaining the desired film laminate having excellent adhesion strength or heat-seal strength, the dynamic property of the adhesive resin layer must satisfy the conditions as mentioned below, at 20° C and 100° C. That is, when measured at a crosshead speed of 30 cm/minute, it has a Young's modulus $\epsilon$:

$$10^7 \text{ (dyne/cm}^2\text{)} < \epsilon < 10^{10} \text{ (dyne/cm}^2\text{)} \qquad \text{(Formula A)}$$

and a breaking elongation $(\Delta l/l_o) \times 100$ (a rate of elongation to the initial length):

$$(\Delta l/lo) \times 100 > 40 \, (\%) \quad \text{(Formula B)}$$

When the adhesive resin layer has a Young's modulus of $10^{10}$ cyne/cm$^2$ or more, the adhesive resin layer becomes hard and glass-like, and thereby a stress concentration to the surface etc. occurs to give a product having poor adhesion strength or heat-seal strength, and on the other hand, when the adhesive resin layer has a Young's modulus of $10^7$ dyne/cm$^2$ or less, the layer becomes soft and can not keep good cohesive force enough to resist destruction and can not show excellent elongation is more than 40%. Besides, when the adhesive resin layer has a breaking elongation of 40% or less, the layer can not have toughness enough to resist destruction and can not have excellent adhesion strength or heat-seal strength either, even if the Young's modulus is in a range of $10^7$ (dyne/cm$^2$)$<\epsilon<10^{10}$ (dyne/cm$^2$).

Therefore, for obtaining the desired film laminate having excellent adhesion strength or heat-seal strength in the wide range of temperature from low temperature such as less than room temperature through high temperature such as more than 100° C, the adhesive resin layer must satisfy the conditions of Formula A and Formula B at 20° C and 100° C.

It is preferable that the adhesive resin layer shows the Young's modulus and breaking elongation of the above range even at the temperature of above 100° C.

It has been studied to find an excellent adhesive resin having not only the above condition (5) but also the conditions (1) through (4), and then, there has now been found a heat-adhesive film laminate having excellent heat resistance at a temprature from low temperature such as less than room temperature through high temperature such as more than 100° C.

An object of the present invention is to provide a heat-adhesive film laminate which is produced by laminating a film of plastic material having excellent heat resistance such as polyesters, polyamides or polycarbonates on one side of a metal foil and further laminating on other side thereof a film of a resin comprising predominantly block copolyester having a melting point of higher than 140° C but lower than the temperature at which the characteristics of the above plastic film is deteriorated and having such dynamic properties (when it is distored at 20° C and 100° C at a crosshead speed of 30 cm/minute) as a Young's modulus $\epsilon$ (dyne/cm$^2$) and a breaking elongation ($\Delta l/lo$) × 100 (%) as follows, respectively:

$$10^7 \, (\text{dyne/cm}^2) < \epsilon < 10^{10} \, (\text{dyne/cm}^2) \text{ and}$$

$$(\Delta l/lo) \times 100 > 40 \, (\%)$$

The metal foil used as a base layer in the present film laminate may be aluminum foil, copper foil, iron foil and the like. Any plastic material may be inserted within such metal foil.

The plastic film having excellent heat resistance used for laminating on one side of the metal foil may be made from a polyester (e.g. polyethylene terephthalate, poly(ethylene terephthalate/ethylene isophthalate), polytetramethylene terephthalate, or polyethylene-1,2-diphenoxyethane-4,4'-dicarboxylate), a polyamide (e.g. nylon 6, nylon 66, nylon 6/10, or polyxylylene adipamide), a polycarbonate (e.g. 4,4'-dihydroxydiphenyl-2,2-propane, i.e. bisphenol A), a copolymer comprising predominantly the monomers of the above polymer, or a mixture of these polymer or copolymer with other polymer having similarly excellent or superior heat resistance to that of the above polymer or copolymer. The plastic film may be any of non-oriented film, uniaxially oriented film, or biaxially oriented film, but the biaxially oriented film is particularly preferable one. These films may include other additives such as an antistatic agent, a lubricant, a haze preventing agent, a plasticizer, a stabilizer, an antiblocking agent, a colorant or the like. The plastic film used in the present invention has preferably a melting point of 200° C or more.

The block copolyester to be laminated on the above laminate of the plastic film having excellent heat resistance and the metal foil comprises a crystalline polyester segment having a high melting point and a polymer segment having a low melting point and a molecular weight of 400 or more, and has a melting point of higher than 140° C but lower than the temperature at which the characteristics of the plastic film having excellent heat resistance is deteriorated, and further has such dynamic properties (when it is distorted at 20° C and 100° C at a crosshead speed of 30 cm/minute) as a Young's modulus $\epsilon$ (dyne/cm$^2$) and a breaking elongation ($\Delta l/lo$) × 100 (%) as follows, respectively, $$10^7 \, (\text{dyne/cm}^2) < \epsilon < 10^{10} \, (\text{dyne/cm}^2) \text{ and}$$

$$(\Delta l/lo) \times 100 > 40 \, (\%)$$

The temperature at which the characteristics of the plastic film having excellent heat resistance is deteriorated means a temperature at which the dynamic properties of the film is deteriorated, and the temperature may be usually about 20° C lower than the melting point of the polymer (the plastic film).

The component of the crystalline polyester segment having a high melting point may be the one having a melting point of 200° C or more when a polymer having fiber-forming properties is produced by the component alone. The example of the crystalline polyester segment may be the one comprising an aromatic polyester having a bond at para position, such as ethylene terephthalate unit, tetramethylene terephthalate unit or the like as the main component. The preferred one comprises 70 or more % by weight of ethylene terephthalate unit or tetramethylene tetraphthalate unit. It may contain partially a dibasic acid component, such as isophthalic acid, adipic acid, sebacic acid, or dodecanoic acid. The crystalline polyester segment having a high melting point has preferably a molecular weight of 400 to 10,000.

The polymer segment having a low melting point may be substantially amorphous in the block copolyester. The examples of the polymer segment having a low melting point may be polyether, aliphatic polyester, polylactone or the like. The polymer segment has usually a molecular weight of 400 to 6,000, preferably 700 to 3,000. The ratio of the polymer segment having a low melting point in the block copolyester may be preferably in a range of 5 to 80% by weight, more preferably 10 to 60% by weight, furthermore preferably 20 to 50% by weight.

The suitable examples of the polymer segment having a low melting point may be polyethylene oxide glycol, polytetramethylene oxide glycol, polyethylene adipate, polyethylene dodecanoate, polyneopentyl adipate, polyneopentyl sebacate, polyneopentyl dodecanoate, poly(ε-caprolactone), polypivalolactone, or the like.

The suitable examples of the block copolyester may be polyethylene terephthalate/polyethylene oxide block copolymer, polytetramethylene terephthalate/polyethylene oxide block copolymer, polyethylene terephthalate/polytetramethylene oxide block copolymer, polytetramethylene terephthalate/polytetramethylene oxide block copolymer, polyethylene terephthalate/poly-ε-caprolactone block copolymer, polytetramethylene terephthalate/poly-ε-caprolactone block copolymer, polyethylene terephthalate/polypivalolactone block copolymer, polyethylene terephthalate/polyethylene adipate block copolymer, polyethylene terephthalate/polyneopentyl sebacate block copolymer, polytetramethylene terephthalate/polyethylene dodecanoate block copolymer, polytetramethylene terephthalate/polyneopentyl dodecanoate block copolymer, polyethylene terephthalate.isophthalate/polytetramethylene oxide block copolymer, polytetramethylene terephthalate.isophthalate/polytetramethylene oxide block copolymer, or the like.

The present three layers film laminate may be produced by applying an adhesive to either one of the plastic film having excellent heat resistance or the metal foil, drying and then putting together to give a two layers film laminate of the plastic film having excellent heat resistance and the metal foil, and further laminating a block copolyester film on the two layers film laminate. The order of lamination of the above films may be optionally changed.

The lamination of the block copolyester film may be carried out by extrusion lamination method, i.e. by melt-extruding the block copolyester and laminating it on the plastic film having excellent heat resistance or the metal foil, or by dry lamination method, i.e. by applying an adhesive to either one of the side of metal foil of the two layers film laminate or the block copolyester film, drying it and then laminating thereon another film. When the extrusion lamination method is used, the block copolyester may be directly extruded and laminated on the two layers film laminate, or optionally any known adhesive may be applied to the laminate and dried before the extrusion and lamination of the block copolyester film. As the adhesive there may be used any conventional one such as isocyanate adhesive, acrylic adhesive or epoxy adhesive. The present film laminate may be also produced by applying a block copolyester solution on the two layers film laminate by gravure roll coating, reverse-roll coating, rod coating, spray coating or the like and drying to remove the solvent.

The plastic film having excellent heat resistance, metal foil and the block copolyester film may have various thicknesses. The suitable thickness thereof may be chosen according to the utility of the film laminate and the use condition thereof, but the thickness of the plastic film having excellent heat resistance may be preferably 10 μ or more, particularly 10 to 500 μ, more particularly 12 to 20 μ, that of the metal foil may be preferably 9 μ or more, particularly 10 to 100μ, more particularly 10 to 30 μ, and that of the block copolyester film may be preferably 30 μ or more, particularly 30 to 500 μ, more particularly 30 to 70 μ.

In the present film laminate, other plastic film or metal foil may be optionally laminated on outside of the laminate or between the two layers film laminate and the block copolyester film, or any other resin may be optionally coated thereon, or further there may be printed thereon.

The film laminate of the present invention can be heat-sealed without losing the dynamic properties and the beautiful sight of the plastic film having excellent heat resistance such as polyester film, polyamide film or polycarbonate film, and has excellent heat resistance being capable of tolerating to retort sterilization, and further has excellent heat-seal strength in a wide range of temperature from low temperature such as less than room temperature through high temperature such as more than 100° C.

Moreover, the present film laminate has excellent tearing strength, pinhole resistance, impact strength, wear resistance, blocking resistance and oil resistance, and further it is nontoxic. The present film laminate is useful particularly as a packaging material for foods, because the foods packaged by the present film laminate can be preserved for a long time without any putrescence and discoloring according to the excellent moisture-proofness, barrier from oxygen, light and ultraviolet rays of the metal foil.

The present invention is illustrated by the following examples, but not limited thereto. In the examples, "part" means part by weight, and the tests were carried out as follows:

1. Young's modulus and breaking elongation

The test material was melted, and made film and allowed to cool. The test film thus produced was cut in 1 cm in width and then allowed to stand at a prescribed temperature for 5 minutes by using Tensilon (UTM-III type, made by Toyo Seiki K.K.). The load-elongation diagram was drawn at a gauge length of 1.5 cm and at a crosshead speed of 30 cm/minute, and thereby the Young's modulus $\epsilon$ (dyne/cm$^2$) and the breaking elongation ($\Delta$l/lo) × 100 (%) were calculated.

2. Melting point

By using a micromelting point apparatus (made by Yanagimoto Seisakusho), the temperature was raised in a rate of 1° C/minute and the point was checked when it became dark view under observing by a polar-microscope.

3. Heat-seal strength of the laminated film

Tensilon (UTM-III type, made by Toyo Seiki K.K.) was used. The heat-sealed laminated film was allowed to stand at a prescribed temperature for 5 minutes and then subjected to T-peel at a crosshead speed of 30 cm/minute.

4. Water vapor permeability

It was measured by the provision of JIS Z 0208.

5. Oxygen permeability

It was measured in the similar manner to the provision of ASTM D 1434–63.

EXAMPLE 1

A stainless steel reactor was charged with dimethyl terephthalate (10,000 parts), 1,4-butanediol (5,800 parts) and titanium butoxide (6 parts) and the mixture was subjected to ester exchange reaction at 140° to 230° C in nitrogen gas. The reaction mixture was added to a mixture of polytetramethylene oxide having molecular weight of 1,000 (3,800 parts) and Irganox 1010 (anti-oxidant, made by Ciba-Geigy; 30 parts) which was preheated at 230° C. The pressure in the reactor was gradually reduced the temperature, and then the mixture was subjected to polycondensation reaction at 245° C, at reduced pressure of about 0.1 mmHg for 2 hours with agitation to give polytetramethylene terephthalate/polytetramethylene oxide block copolymer [I]. The copolymer thus obtained was cooled with water and then pelletized to give a cylindrical pellet having 3 mm in diameter and 3 mm in length which was dried at 80° C, at about 0.1 mmHg for 5 hours. The reduced viscosity of the copolymer thus obtained was 1.74 dl/g, which was measured at concentration of 0.2 g/dl in phenol/tetrachloroethane: 6/4 by weight and at 30° C. The melting point thereof was 215° C.

The block copolyester was heat-pressed at 230° C, 4 kg/cm$^2$ for 30 seconds by using an iron plate coated with polytetrafluoroethylene and then allowed to cool to give a film. The dynamic properties of the film thus obtained were measured at 20° C, 100° C and 160° C. The results are shown in Table 1.

Table 1

| Young's modulus $\epsilon$ (dyne/cm$^2$) | | | Breaking elongation ($\Delta l/lo$) × 100 (%) | | |
|---|---|---|---|---|---|
| 20° C | 100° C | 160° C | 20° C | 100° C | 160° C |
| 2.0 × 10$^9$ | 8.0 × 10$^8$ | 4.0 × 10$^8$ | 400 | 400 | 300 |

To a biaxially oriented polyethylene terephthalate film having 12 $\mu$ in thickness was applied a polyester-isocyanate adhesive, i.e. a 20% solution of Vylon 300 (made by Toyo Boseki K.K.)/Collonate L (made by Nippon Polyurethane K.K.): 95/5 by weight of solid part in ethyl acetate by gravure coater (100 mesh × 40 $\mu$) at a rate of 20 m/minute, and the resultant was dried. An aluminum foil having 12 $\mu$ in thickness (made by Showa Aluminum K.K.) was thereon laminated at nip temperature of 80° C and at nip pressure of 4 kg/cm$^2$ to give a laminated film of polyethylene terephthalate film and aluminum foil. To the aluminum foil side of the above laminated film was applied the same adhesive solution as above and dried, and thereon the block copolyester [I] was melt-extruded at 230° C of the resin temperature and laminated in the thickness of 40 $\mu$ at a rate of 40 m/minute. Two sheets of the film laminate thus obtained were put together wherein the side of block copolyester layer of both laminates faced to each other, and then it was heat-sealed at 250° C, 2 kg/cm$^2$ for one second. The heat-seal strength thereof was 3,900 g/cm at room temperature and 550 g/cm at 160° C. The heat-seal strength at both temperatures was excellent enough to use the laminate practically.

EXAMPLE 2

A stainless steel reactor was charged with dimethyl terephthalate (6,200 parts), 1,4-butanediol (4,000 parts) and titanium butoxide (5.5 parts) and the mixture was subjected to ester exchange reaction at 140° to 230° C in nitrogen gas. The reaction mixture was added to a mixture of polytetramethylene oxide having molecular weight of 1,000 (5,000 parts) and Sumilizer BET (antioxidant, made by Sumitomo Chemical Co., Ltd.; 23 parts) which was preheated at 230° C. The pressure in the reactor was gradually reduced while raising the temperature, and then the mixture was subjected to polycondensation reaction at 245° C, at reduced pressure of about 0.1 mmHg for 2 hours with agitation to give polytetramethylene terephthalate/polytetramethylene oxide block copolymer [II], which was dried at 80° C at reduced pressure of about 0.1 mmHg for 5 hours. The reduced viscosity ($\eta$sp/C) of the copolymer thus obtained was 1.99 dl/g, which was measured at concentration of 0.2 g/dl in phenol/tetrachloroethane: 6/4 by weight and at 30° C. The melting point thereof was 205° C.

The block copolyester [II] was heat-pressed at 230° C, 4 kg/cm$^2$ for 30 seconds by using an iron plate coated with polytetrafluoroethylene and then allowed to cool to give a film. The dynamic properties of the film thus obtained were measured at 20° C, 100° C and 150° C. The results are shown in Table 2.

Table 2

| Young's modulus $\epsilon$ (dyne/cm$^2$) | | | Breaking elongation ($\Delta l/lo$) × 100 (%) | | |
|---|---|---|---|---|---|
| 20° C | 100° C | 150° C | 20° C | 100° C | 150° C |
| 1.0 × 10$^9$ | 7.0 × 10$^8$ | 2.0 × 10$^8$ | 500 | 400 | 300 |

To a biaxially oriented polyethylene terephthalate film having 12 $\mu$ in thickness, nylon 66 film having 15 $\mu$ in thickness and a polycarbonate film made from bisphenol A having 15 $\mu$ in thickness was applied an isocyanate adhesive, i.e. a 20% solution of Nippolane 3002 (made by Nippon Polyurethane K.K.)/Collonate L (made by Nippon Polyurethane K.K.): 100/40 by weight in ethyl acetate by gravure coater (100 mesh × 40 $\mu$) at a rate of 20 m/minute. After drying, the resultant was laminated with an aluminum foil having 12 $\mu$ in thickness in the same manner as described in Example 1. To the aluminum foil side of the above laminated film was applied the same isocyanate adhesive as above and dried, and thereon a non-oriented film having about 50 $\mu$ in thickness which was made by melt-extruding the block copolyester [II] at 230° C was laminated at nip temperature of 90° to 95° C and at nip pressure of 5 kg/cm$^2$ by dry lamination method to give a three layers film laminate. Two sheets of the film laminate thus obtained were put together wherein the side of block copolyester layer of both laminates faced to each other, and then it was heat-sealed under the conditions as shown in Table 3. The heat-seal strength thereof was measured at 20° C and 150° C and as the results, the heat-seal strength was excellent enough to use the laminate practically. The results are shown in Table 3.

Table 3

| Film laminate | Conditions for heat-sealing | Heat-seal strength (g/cm) | |
|---|---|---|---|
| | | 20° C | 150° C |
| Polyethylene terephthalate/ aluminum/block copolyester [II] | 250 ° C 2 kg/cm$^2$ 1 second | 3,000 | 500 |
| Nylon 66/aluminum/ block copolyester [II] | 240 ° C 2 kg/cm$^2$ 1 second | 2,000 | 300 |
| Polycarbonate/ aluminum/block copolyester [II] | 220 ° C 2 kg/cm$^2$ 1 second | 2,800 | 300 |

On the three film laminates obtained in this example and a two layers laminated film comprising polyethylene terephthalate film having 12 $\mu$ in thickness and block copolyester [II] film having 50 $\mu$ in thickness there were measured the water vapor permeability and the oxygen permeability at 30° C. The results are shown in Table 4.

As made clear from the results, the film laminates of the present invention showed the water vapor permeability and oxygen permeability being both nearly zero, which means that the film laminates have excellent barrier characteristics enough for preservation of foods.

Table 4

| Test No. | Components of film laminate | Water vapor permeability (g/m².24 hr) | Oxygen permeability (cc/m².24 hr.atm) |
|---|---|---|---|
| 1 | Polyethylene terephthalate/ aluminum/block copolyester [II] (12/12/50) | 0 | <1 |
| 2 | Nylon 66/aluminum/ block copolyester [II] (15/12/50) | 0 | <1 |
| 3 | Polycarbonate/ aluminum/block copolyester [II] (15/12/50) | 0 | <1 |
| 4 | Polyethylene terephthalate/ block copolyester [II] (12/50) | 6 | 200 |

[Note]:
1) Test Nos. 1 to 3 are the present film laminate and Test No. 4 is Comparative Example.
2) The numeral in components of film laminate means the thickness ($\mu$) of the film of each component.

EXAMPLE 3

A stainless steel reactor was charged with dimethyl terephthalate (6,200 parts), ethylene glycol (5,000 parts), zinc acetate (5 parts) and antimony trioxide (3 parts) and the mixture was subjected to ester exchange reaction at 140° to 230° C in nitrogen gas. The reaction mixture was added to a mixture of polytetramethylene oxide having molecular weight of 1,000 (5,000 parts) and Irganox 1010 (antioxidant, made by Ciba-Geigy; 23 parts) which was preheated at 230° C. The pressure in the reactor was gradually reduced while raising the temperature, and then the mixture was subjected to polycondensation reaction at 245° C, at reduced pressure of about 0.1 mmHg for 2 hours with agitation to give polyethylene terephthalate/polytetramethylene oxide block copolymer [III], which was dried at 80° C, at reduced pressure of about 0.1 mmHg for 2 hours. The reduced viscosity ($\eta$sp/C) of the copolymer thus obtained was 1.59 dl/g, which was measured at concentration of 0.2 g/dl in phenol/tetrachloroethane: 6/4 by weight and at 30° C. The melting point thereof was 200° C.

The block copolyester was heat-pressed at 230° C, 4 kg/cm² for 30 seconds by using an iron plate coated with polytetrafluoroethylene and then allowed to cool to give a film. The dynamic properties of the film thus obtained were measured at 20° C, 100° C and 150° C. The results are shown in Table 5.

Table 5

| Young's modulus $\epsilon$ (dyne/cm²) | | | Breaking elongation ($\Delta l/lo$) × 100 (%) | | |
|---|---|---|---|---|---|
| 20° C | 100° C | 150° C | 20° C | 100° C | 150° C |
| 6.0 × 10⁸ | 4.0 × 10⁸ | 1.0 × 10⁸ | 600 | 400 | 400 |

In the same manner as described in Example 1, on a biaxially oriented polyethylene terephthalate film having 12 $\mu$ in thickness was laminated an aluminum foil having 12 $\mu$ in thickness and further on the aluminum foil side of the laminated film obtained above was melt-extruded at 230° C and laminated in the thickness of 40 $\mu$ to give a three layers film laminate of polyethylene terephthalate/aluminum/block copolyester. Two sheets of the film laminate thus obtained were put together wherein the side of block copolyester layer of both laminates faced to each other, and then it was heat-sealed at 250° C, 2 kg/cm² for one second. The heat-seal strength thereof was 2700 g/cm at 20° C and 200 g/cm at 150° C. The heat-seal strength at both temperatures was excellent enough to use the laminate practically.

EXAMPLE 4

A stainless steel reactor was charged with dimethyl terephthalate (6,000 parts), dimethyl isophthalate (2,000 parts), 1,4-butanediol (4,600 parts) and titanium tetrabutoxide (4.5 parts) and the mixture was subjected to ester exchange reaction at 140° to 230° C in nitrogen gas. The reaction mixture was added to a mixture of polytetramethylene oxide having molecular weight of 1,000 (3,000 parts) and Irganox 1010 (antioxidant, made by Ciba-Geigy; 24 parts) which was preheated at 230° C. The pressure in the reactor was gradually reduced while raising the temperature, and then the mixture was subjected to polycondensation reaction at 245° C, at reduced pressure of about 0.1 mmHg for 2 hours with agitation to give polytetramethylene terephthalate.isophthalate/polytetramethylene oxide block copolymer [IV]. The reaction product was dried at 80° C, at reduced pressure of about 0.1 mmHg for 2 hours. The reduced viscosity ($\eta$sp/C) of the copolymer thus obtained was 1.70 dl/g, which was measured at concentration of 0.2 g/dl in phenol/tetrachloroethane: 6/4 by weight and at 30° C. The melting point thereof was 185° C.

The block copolyester was heat-pressed at 230° C, 4 kg/cm² for 30 seconds by using an iron plate coated with polytetrafluoroethylene and then allowed to cool to give a film. The dynamic properties of the film thus obtained were measured at 20° C, 100° C and 160° C. The results are shown in Table 6.

Table 6

| Young's modulus $\epsilon$ (dyne/cm²) | | | Breaking elongation ($\Delta l/lo$) × 100 (%) | | |
|---|---|---|---|---|---|
| 20° C | 100° C | 160° C | 20° C | 100° C | 160° C |
| 2.0 × 10⁸ | 2.5 × 10⁸ | 4.0 × 10⁷ | 600 | 350 | 200 |

In the same manner as described in Example 1, a three layers film laminate of polytetramethylene terephthalate/aluminum/block copolyester was made from polytetramethylene terephthalate having 15 $\mu$ in thickness, aluminum foil having 13 $\mu$ in thickness and block copolyester [IV] film having 50 $\mu$ in thickness. Two sheets of the film laminate thus obtained were put together wherein the side of block copolyester layer of both laminates faced to each other, and then it was heat-sealed at 250° C, 2 kg/cm² for one second. The heat-seal strength thereof was 3,400 g/cm² at 20° C and 200 g/cm at 160° C. The heat-seal strength at both temperatures was excellent enough to use the laminate practically.

COMPARATIVE EXAMPLE 1

In the same manner as described in Example 1, a biaxially oriented polyethylene terephthalate film having 12 μ in thickness was laminated on an aluminum foil having 12 μ in thickness and further on the side of the aluminum foil thereof was melt-extruded and laminated polyethylene in the thickness of 50 μ to give a three layers film laminate of polyethylene terephthalate/aluminum/polyethylene (12 μ/13 μ/50 μ). Two sheets of the film laminate thus obtained were put together wherein the side of block copolyester of both laminates faced to each other, and then it was heat-sealed at 250° C, 2 kg/cm² for one second. The heat-seal strength thereof was 2,200 g/cm at 20° C, but it could not be measured at 160° C since it was melt at the temperature.

laminate were put together (inside dimension: 10 cm × 5 cm) wherein the side of the heat sensitive film of both laminates faced to each other, and then all sides thereof were heat-sealed (seal width: 1 cm), wherein water of 40 cc was enclosed. The packaged material was put into one liter autoclave, to which water was added so as to remain headspace of the same ratio as that of the packaged material. After closing, the autoclave was heated for about 20 minutes to 160° C and kept at 160° for 5 minutes and then cooled from outside for about 20 minutes by water to 40° C, and thereafter the autoclave was opened. It was then observed whether the seal of the laminate was broken or not. The results are shown in Table 7.

As made clear from the results, the film laminates of Example 1 to 4 had excellent heat resistance enough to resist to the retort sterilization at 160° C.

Table 7

| No. | Kinds of film laminate | Break of film |
|---|---|---|
| 1 | Polyethylene terephthalate/aluminum/block copolyester [I] (Example 1) | No |
| 2 | Polyethylene terephthalate/aluminum/block copolyester [II] (Example 2) | No |
| 3 | Nylon 66/aluminum/block copolyester [II] (Example 2) | No |
| 4 | Polycarbonate/aluminum/block copolyester [II] (Example 2) | No |
| 5 | Polyethylene terephthalate/aluminum/block copolyester [III] (Example 3) | No |
| 6 | Polytetramethylene terephthalate/aluminum/block copolyester [IV] (Example 4) | No |
| 7 | Polyethylene terephthalate/aluminum/polyethylene (Comparative Example 1) | Significantly |
| 8 | Polyethylene terephthalate/aluminum/random copolyester [V] (Comparative Example 2) | Yes |

COMPARATIVE EXAMPLE 2

On a biaxially oriented polyethylene terephthalate film having 12 μ thickness was laminated an aluminum foil having 12 μ thickness, and further thereon was melt-extruded and laminated in thickness of 40 μ a random copolyester [V] of poly(ethylene terephthalate/dodecane dicarboxylate): 80/20 by mole, which was produced by subjecting dimethyl terephthalate, ethylene glycol and dodecanedicarboxylic acid to ester exchange reaction. Two sheets of the film laminate thus obtained were put together wherein the side of random copolyester layer of both laminates faced to each other, and then it was heat-sealed at 250° C, 2 kg/cm² for one second. The heat-seal strength thereof was 1,000 g/cm at 20° C and 50 g/cm at 160° C.

The random copolyester [V] had melting point of 210° to 220° C and showed the dynamic properties: Young's modulus and breaking elongation as follows, respectively:
at room temperature: 8 × 10⁸ dyne/cm² and 100%
at 100° C: 5 × 10⁸ dyne/cm² and 30%, and
at 160° C: 5 × 10⁸ dyne/cm² and 20%.

EXAMPLE 5

By using various film laminates of Examples 1 to 4 and Comparative Examples 1 to 2, packaged materials were prepared. That is, two sheets of the each film

What is claimed is:

1. A heat-adhesive film laminate consisting essentially of (A) a plastic film having excellent heat resistance and a melting point of 200° C or more made from a polyester, polyamide or polycarbonate which is in the form of a non-oriented film, a uniaxially oriented film or a biaxially oriented film, said plastic film being laminated on one side of (B) a metal foil, and (C) a film of a resin comprising predominantly block copolyester selected from the group consisting of polyethylene terephthalate/polytetramethylene oxide block copolymer, polytetramethylene terephthalate/polytetramethylene oxide block copolymer, polyethylene terephthalate.isophthalate/polytetramethylene oxide block copolymer and polytetramethylene terephthalate.isophthalate/polytetramethylene oxide block copolymer, said block copolyester having a melting point higher than 140° C. but at least 20° C. lower than the melting point of the plastic film and a Young's modulus $\epsilon$ (dyne/cm²) and a breaking elongation $(\Delta l/l o) \times 100$ (%) when measured at 20° C and 100° C being respectively $$10^7 \text{ (dyne/cm}^2) < \epsilon < 10^{10} \text{ (dyne/cm}^2) \text{ and}$$

$$(\Delta l/l o) \times 100 > 40(\%),$$

said film of resin being laminated on the other side of the metal foil.

2. A heat-adhesive film laminate according to claim 1, wherein the block copolyester comprises (1) a crystalline polyester segment consisting of polyethylene terephthalate unit, polytetramethylene terephthalate unit, polyethylene terephthalate.isophthalate unit or polytetramethylene terephthalate.isophthalate unit, said crystalline polyester segment having a melting point of 200° C or more when a polymer having fiber-forming properties is produced by the monomer composing the unit alone and having a molecular weight of 400 to 10,000, and (2) a polymer segment consisting of polytetramethylene oxide and having a molecular weight of 400 to 6,000, said polymer segment being included in a ratio of 5 to 80% by weight in the block copolyester.

3. A heat-adhesive film laminate according to claim 2, wherein the crystalline polyester segment consists of polyethylene terephthalate.isophthalate unit or polytetramethylene terephthalate.isophthalate unit and includes 70 or more % by weight of ethylene terephthalate unit or tetramethylene terephthalate unit.

4. The heat-adhesive film laminate according to claim 2, wherein the polymer segment is included in a range of 10 to 60% by weight in the block copolyester.

5. The heat-adhesive film laminate according to claim 2, wherein the plastic film is a biaxially oriented polyethylene terephthalate film having a thickness of 10 to 30 $\mu$, the metal foil is an aluminum foil having a thickness of 10 to 30 $\mu$ and the film of resin has a thickness of 30 to 70 $\mu$ made from polytetramethylene terephthalate/polytetramethylene oxide block copolymer containing 20 to 50% by weight of polytetramethylene oxide having a molecular weight of 400 to 3,000.

6. The heat-adhesive film laminate according to claim 2, wherein the plastic film is polyethylene terephthalate film having a thickness of 10 to 30 $\mu$, the metal foil is an aluminum foil having a thickness of 10 to 30 $\mu$ and the film of resin has a thickness of 30 to 70 $\mu$ made from polytetramethylene terephthalate.isophthalate/polytetramethylene oxide block copolymer containing 20 to 50% by weight of polytetramethylene oxide having a molecular weight of 400 to 3,000.

7. A heat-adhesive film laminate according to claim 1 which comprises (A) a plastic film having a thickness of 10 to 500$\mu$, (B) a metal foil selected from the group consisting of aluminum foil, copper foil, iron foil and a foil in which a plastic material is inserted within the metal foil, said metal foil having a thickness of 10 to 100$\mu$, and (C) a block copolyester film having a thickness of 30 to 500$\mu$.

8. A heat-adhesive film laminate according to claim 7 which comprises (A) a plastic film consisting of a biaxially oriented polyester, polyamide or polycarbonate film having a thickness of 10 to 30 $\mu$, (B) an aluminum foil having a thickness of 10 to 30 $\mu$, and (C) a block copolyester film having a thickness of 30 to 70 $\mu$ made from polytetramethylene terephthalate/polytetramethylene oxide block copolymer containing 20 to 50% by weight of polytetramethylene oxide having a molecular weight of 400 to 3,000.

9. The heat-adhesive film laminate according to claim 7 which comprises (A) a plastic film consisting of a biaxially oriented polyester, polyamide or polycarbonate film having a thickness of 10 to 30 $\mu$, (B) an aluminum foil having a thickness of 10 to 30 $\mu$, and (C) a block copolyester film having a thickness of 30 to 70 $\mu$ made from polytetramethylene terephthalate.isophthalate/polytetramethylene oxide block copolymer containing 20 to 50% by weight of polytetramethylene oxide having a molecular weight of 400 to 3,000.

10. The heat-adhesive film laminate according to claim 1, wherein the metal foil is selected from the group consisting of aluminum foil, copper foil, iron foil and a foil in which a plastic material is inserted within the metal foil.

11. The heat-adhesive film laminate according to claim 1, wherein the plastic film has a thickness of 10 to 500 $\mu$, the metal foil has a thickness of 10 to 100 $\mu$ and the block copolyester film has a thickness of 30 to 500 $\mu$.

12. The heat-adhesive film laminate according to claim 11, wherein the plastic film has a thickness of 10 to 30 $\mu$, the metal foil has a thickness of 10 to 30 $\mu$ and the block copolyester film has a thickness of 30 to 70 $\mu$.

* * * * *